(12) United States Patent
Nissila

(10) Patent No.: US 8,929,427 B2
(45) Date of Patent: Jan. 6, 2015

(54) METHOD, APPARATUS, COMPUTER PROGRAM AND COMPUTER PROGRAM DISTRIBUTION MEDIUM FOR A COMMUNICATION RECEIVER

(75) Inventor: Mauri Nissila, Oulu (FI)

(73) Assignee: Nokia Corporation, Espoo (FI)

( * ) Notice: Subject to any disclaimer, the term of this patent is extended or adjusted under 35 U.S.C. 154(b) by 259 days.

(21) Appl. No.: 13/266,742

(22) PCT Filed: Apr. 27, 2009

(86) PCT No.: PCT/FI2009/050332
§ 371 (c)(1),
(2), (4) Date: Oct. 27, 2011

(87) PCT Pub. No.: WO2010/125225
PCT Pub. Date: Nov. 4, 2010

(65) Prior Publication Data
US 2012/0044981 A1    Feb. 23, 2012

(51) Int. Cl.
H03K 5/159    (2006.01)
H04L 27/06    (2006.01)
H03K 9/00    (2006.01)
H04B 1/7107    (2011.01)
H04L 25/03    (2006.01)

(52) U.S. Cl.
CPC ........ H04B 1/7107 (2013.01); H04L 25/03171 (2013.01)
USPC ............ 375/229; 375/340; 375/341; 375/316

(58) Field of Classification Search
CPC ....... H04B 3/23; H04B 3/235; H03M 13/256; H03M 13/2966; H03M 13/39–13/41; H04N 21/4382; H03H 17/06; H04L 1/0054; H04L 1/0048; H04L 1/005; H04L 7/0058; H04L 25/03949; H04L 25/03968; H04L 25/03987; H04L 2201/08

USPC ......... 375/219, 222, 295, 296, 316, 340, 346, 375/347, 324, 299, 259, 285, 254
See application file for complete search history.

(56) References Cited

U.S. PATENT DOCUMENTS 6,687,235 B1 * 2/2004 Chu .............................. 370/286
6,956,893 B2 10/2005 Frank et al.
(Continued)

FOREIGN PATENT DOCUMENTS

EP    1404047    3/2004
EP    1404047 A2    3/2004
(Continued)

OTHER PUBLICATIONS

International Search Report and Written Opinion received for corresponding Patent Cooperation Treaty Application No. PCT/FI2009/050332, dated Jan. 12, 2010, 11 pages.
Office Action received for corresponding Chinese Application No. 200980159677.7, dated Sep. 27, 2013, 11 pages.
International Search Report received for corresponding Patent Cooperation Treaty Application No. PCT/FI2009/050332, dated Jan. 12, 2010, 4 pages.
(Continued)

Primary Examiner — Sam K Ahn
Assistant Examiner — Linda Wong
(74) Attorney, Agent, or Firm — Squire Patton Boggs (US) LLP

(57) ABSTRACT

The invention relates to an apparatus comprising, a sampler configured to receive and sample a signal for producing signal samples; a first configured to receive or determinate a scaling factor for a reliability factor and to determine power or energy of an input signal of an interference canceller; a generator configured to generate an estimated replica of a transmitted desired signal by using the signal samples; a residual processor configured to subtract the estimated replica from the input signal of an interference canceller for generating a residual signal and to determine power or energy of the residual signal; and a divider configured to divide the power or energy of the residual signal by the power or energy of the input signal of an interference canceller and a multiplier configured to multiply a result of the division by the scaling factor of a reliability factor.

19 Claims, 3 Drawing Sheets

(56) References Cited

U.S. PATENT DOCUMENTS

Figure 1:
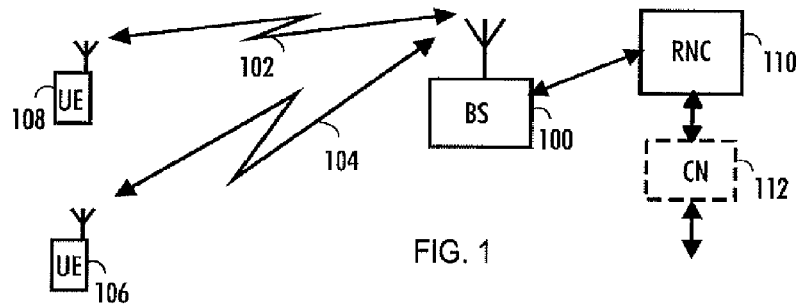

| | | | |
|---|---|---|---|
| 7,295,144 B1* | 11/2007 | Karthik et al. | 341/200 |
| 2002/0097785 A1* | 7/2002 | Ling et al. | 375/147 |
| 2002/0110206 A1 | 8/2002 | Becker et al. | |
| 2004/0022336 A1 | 2/2004 | Yu et al. | |
| 2004/0213354 A1* | 10/2004 | Jones et al. | 375/285 |
| 2010/0208908 A1* | 8/2010 | Hoshuyama | 381/66 |
| 2013/0170542 A1* | 7/2013 | Sato | 375/240.02 |

FOREIGN PATENT DOCUMENTS

| | | |
|---|---|---|
| TW | 507443 | 10/2002 |
| WO | 01/69873 A2 | 9/2001 |
| WO | 0169873 | 9/2001 |

OTHER PUBLICATIONS

Written Opinion received for corresponding Patent Cooperation Treaty Application No. PCT/FI2009/050332, dated Jan. 12, 2010, 6 pages.

International Preliminary Report on Patentability received for corresponding Patent Cooperation Treaty Application No. PCT/FI2009/050332, dated Nov. 1, 2011, 7 pages.

Office Action dated Feb. 19, 2014, issued in corresponding Chinese patent application No. 200980159677.7 (with English abstract).

Office Action dated May 27, 2014, issued in corresponding Chinese Application No. 200980159677.7.

Office Action dated Jul. 29, 2014, issued in corresponding Taiwan Patent Application No. 99113078 (with English translation).

* cited by examiner

METHOD, APPARATUS, COMPUTER PROGRAM AND COMPUTER PROGRAM DISTRIBUTION MEDIUM FOR A COMMUNICATION RECEIVER

RELATED APPLICATION

This application was originally filed as PCT Application No. PCT/FI2009/050332 filed on Apr. 27, 2009, which is incorporated herein by reference in its entirety.

FIELD

The invention relates to a method, apparatuses, a computer program and computer program distribution medium.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Multiple input multiple output (MIMO) communication systems are currently receiving a lot of attention. MIMO systems can be used either to mitigate the effects of channel fades or to deliver high bit rates.

A basic paradigm of a turbo receiver is an iterative interconnection of the Soft input soft output (SISO) detector and a SISO decoder. The SISO decoder calculates log-likelihood ratio (LLR) values for input bits, including both systematic and parity bits when a turbo code with systematic component codes are used. For SISO detection purposes, LLR bit values from a decoder need to be mapped into soft symbol values and further into soft chip values by probabilistic bit-to-symbol mapping and spreading operations.

In general, a plurality of possibilities to perform SISO detection exists. One possibility is a minimum mean square error (MMSE) chip equalizer followed by a correlator which is matched to spreading codes of a desired signal and a demodulator which performs the probabilistic symbol-to-soft bits mapping.

High Speed Packet Access, HSPA, is able to provide high data rate transmission to support multimedia services, for example. HSPA includes High Speed Downlink Packet Access (HSDPA) and High Speed Uplink Packet Access (HSUPA).

BRIEF DESCRIPTION

According to an aspect of the present invention, there is provided an apparatus comprising: a sampler configured to receive and sample a signal for producing signal samples; a determinator configured to receive or determinate a scaling factor for a reliability factor and to determine power or energy of an input signal of an interference canceller; a generator configured to generate an estimated replica of a transmitted desired signal by using the signal samples; a residual processor configured to subtract the estimated replica from the input signal of an interference canceller for generating a residual signal and to determine power or energy of the residual signal; and a divider configured to divide the power or energy of the residual signal by the power or energy of the input signal of an interference canceller and a multiplier configured to multiply a result of the division by the scaling factor of a reliability factor for obtaining a reliability factor for adjusting equalizer coefficients.

According to another aspect of the present invention, there is provided a method comprising: determining or receiving a scaling factor for a reliability factor; receiving and sampling a signal for producing signal samples; determining power or energy of the input signal of the interference canceller; generating an estimated replica of a transmitted desired signal by using the signal samples; subtracting the estimated replica of the transmitted desired signal from the input signal of the interference canceller for generating a residual signal; determining power or energy of the residual signal; and dividing the power or energy of the residual signal by the power or energy of the input signal of the interference canceller and multiplying a result of the division by the scaling factor of a reliability factor for obtaining a reliability factor for adjusting equalizer coefficients.

According to another aspect of the present invention, there is provided an apparatus comprising: means for determining or receiving a scaling factor for a reliability factor; means for receiving and sampling a signal for producing signal samples; means for determining power or energy of the input signal of the interference canceller; means for generating an estimated replica of a transmitted desired signal by using the signal samples; means for subtracting the estimated replica of the transmitted desired signal from the input signal of the interference canceller for generating a residual signal; means for determining power or energy of the residual signal; and means for dividing the power or energy of the residual signal by the power or energy of the input signal of the interference canceller, and means for multiplying a result of the division by the scaling factor of a reliability factor for obtaining a reliability factor for adjusting equalizer coefficients.

According to another aspect of the present invention, there is provided a computer program distribution medium readable by a computer and encoding a computer program of instructions for executing a computer process, the process comprising: determining or receiving a scaling factor for a reliability factor receiving and sampling a signal for producing signal samples; determining power or energy of the input signal of the interference canceller; generating an estimated replica of a transmitted desired signal by using the signal samples; subtracting the estimated replica of the transmitted desired signal from the input signal of the interference canceller for generating a residual signal; determining power or energy of the residual signal; and dividing the power or energy of the residual signal by the power or energy of the input signal of the interference canceller and multiplying a result of the division by the scaling factor of a reliability factor for obtaining a reliability factor for adjusting equalizer coefficients.

LIST OF DRAWINGS

Figure 3:
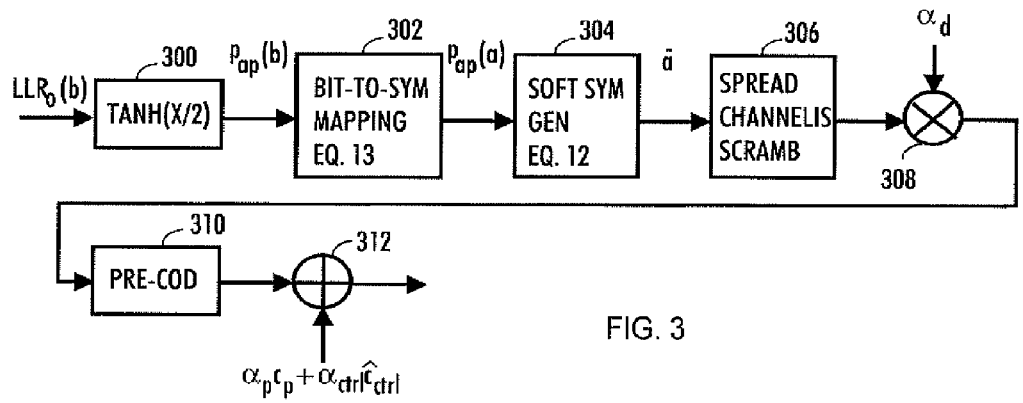
Figure 4A:
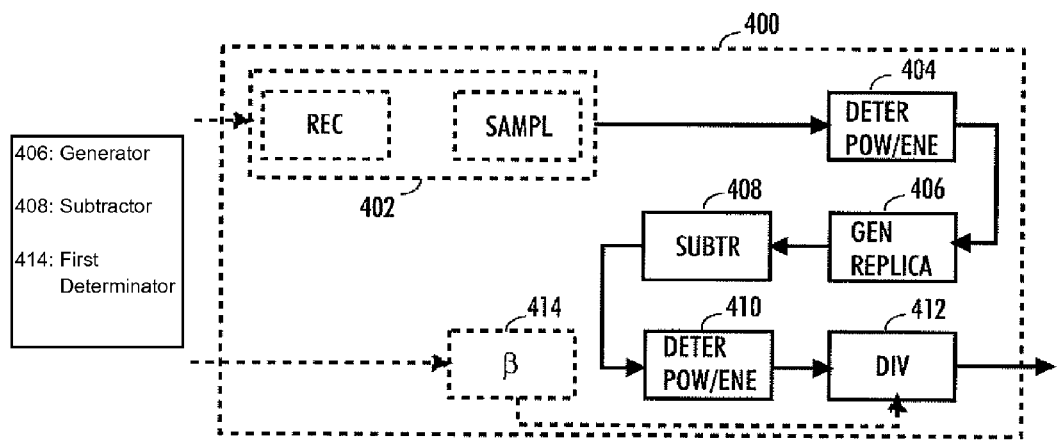
Figure 2:
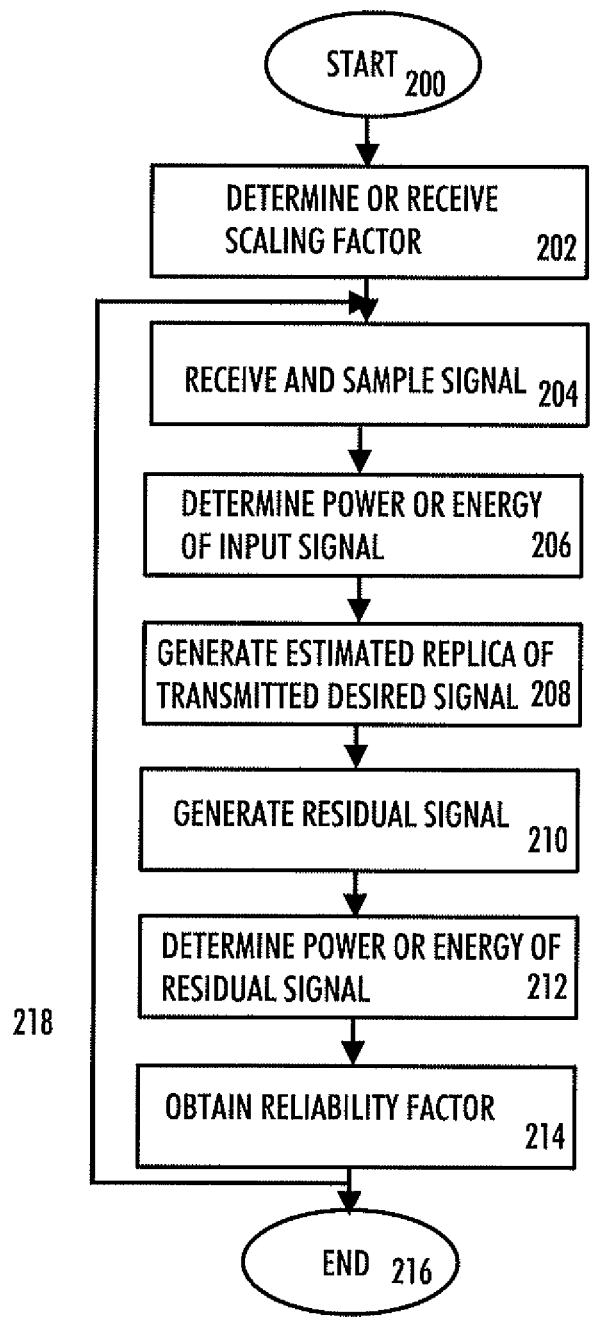
Figure 4B:
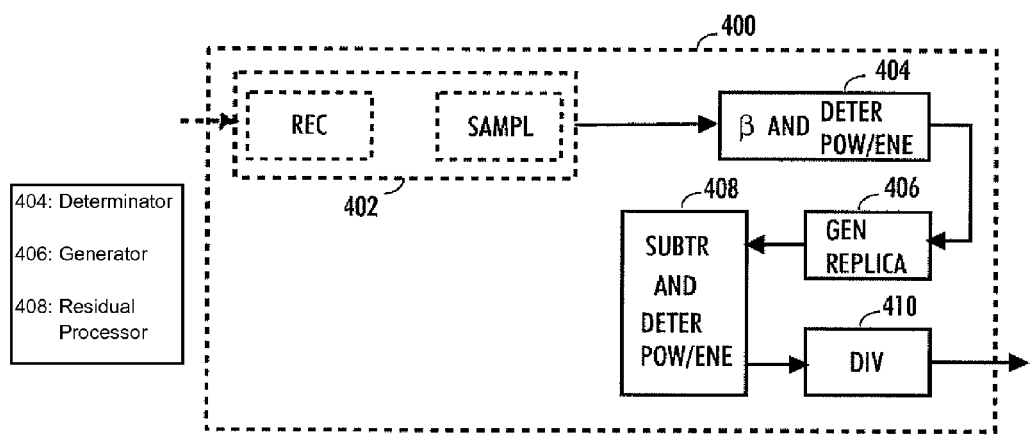

Embodiments of the present invention are described below, by way of example only, with reference to the accompanying drawings, in which FIG. 1 illustrates an example of a communication system;
FIG. 2 is a flow chart;
FIG. 3 illustrates an example of a feedback chain; and
FIGS. 4A-B illustrate examples of an apparatus.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user terminal, server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of a system architecture whereto the embodiments may be applied, an architecture based on Evolved UMTS terrestrial radio access (E-UTRA, UMTS=Universal Mobile Telecommunications System) without restricting the embodiment to such an architecture, however.

Many different radio protocols to be used in communications systems exist. Some examples of different communication systems are the Universal Mobile Telecommunications System (UMTS) radio access network (UTRAN or E-UTRAN), Long Term Evolution (LTE, the same as E-UTRA), Wireless Local Area Network (WLAN), Worldwide Interoperability for Microwave Access (WiMAX), Bluetooth®, Personal Communications Services (PCS) and systems using ultra-wideband (UWB) technology.

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

FIG. 1 shows a part of a radio access network of E-UTRAN. E-UTRAN utilises Wideband Code Division Multiple Access (WCDMA).

The communications system is a cellular radio system which comprises a base station (or node B) 100, which has bi-directional radio links 102 and 104 to user devices 106 and 108. The user devices may be fixed, vehicle-mounted or portable. The user devices 106 and 108 may refer to portable computing devices. Such computing devices include wireless mobile communication devices operating with or without a subscriber identification module (SIM), including, but not limited to, the following types of devices: mobile phone, multimedia device, personal digital assistant (PDA), handset.

The base station includes transceivers, for instance. From the transceivers of the base station, a connection is provided to an antenna unit that establishes bi-directional radio links to the user devices. The base station is further connected to a controller 110, a radio network controller (RNC), which transmits the connections of the devices to the other parts of the network. The radio network controller controls in a centralized manner several base stations connected to it. The radio network controller is further connected to a core network 112 (CN). Depending on the system, the counterpart on the CN side can be a mobile services switching center (MSC), a media gateway (MGW) or a serving GPRS (general packet radio service) support node (SGSN), etc.

It should be noted that in future radio networks, the functionality of an RNC may be distributed among (possibly a subset of) base stations. This is the case for instance in LTE.

The embodiments are not, however, restricted to the system given as an example but a person skilled in the art may apply the solution to other communication systems provided with the necessary properties. Different radio protocols may be used in the communication systems in which embodiments of the invention are applicable. The radio protocols used are not relevant regarding the embodiments of the invention.

The communication system is also able to communicate with other networks, such as a public switched telephone network or the Internet.

In the Wideband Code Division Multiple Access (WCDMA) concept, HSDPA implementations usually include Adaptive Modulation and Coding (AMC) functionality, a shorter frame size (2 ms), Hybrid Automatic Repeat Re-quest (HARQ) functionality and fast Node-B based packet scheduling. HSUPA includes a shorter frame size, HARQ functionality and fast Node-B based scheduling as well.

A basic paradigm of a turbo receiver is an iterative interconnection of the Soft input soft output (SISO) detector and a SISO decoder. The SISO decoder calculates log-likelihood ratio (LLR) values for input bits, including both systematic and parity bits when a turbo code with systematic component codes are used. For SISO detection purposes, LLR bit values from a decoder need to be mapped into soft symbol values and further into soft chip values by probabilistic bit-to-symbol mapping and spreading operations.

In general, a plurality of possibilities to perform SISO detection exists. One possibility is a minimum mean square error (MMSE) chip equalizer followed by a correlator which is matched to spreading codes of a desired signal and a demodulator which performs the probabilistic symbol-to-soft bits mapping.

A SISO detector may also be used in combination of HSDPA and MIMO techniques, in which case the SISO detector suppresses inter-stream interference between the primary and secondary transmitted streams and intersymbol interference caused by the multipath fading channel. Additionally, it suppresses interference between various code channels which are transmitted at the same bandwidth at the same time while made separable by unique labels called orthogonal variable rate spreading codes. Moreover, the SISO detector collects the energy of a desired signal as efficiently as possible from a number of copies of a transmitted signal attenuated and phase-shifted in a radio path. Further, the SISO detector maps the obtained symbol estimates into LLR bit values.

In a given example of a SISO detector, a linear MMSE (LMMSE) equalizer's target is to suppress both inter-stream and inter-symbol interferences, while trying to combine multipath components of a desired signal as close as possible to the optimum. The SISO detector is aiming at making an impulse response function of concatenation of the channel and equalizer as one tap spike while separating channel responses between different antennas, thus rediscovering the orthogonality between different code channels lost in a multipath radio channel. With the restored orthogonality, the desired signal may be separated from other signals by a correlator.

It should be noticed that the equalizer is not, in general, an optimal detector. The task of the equalizer is to simultaneously collect the energy of a desired signal and suppress the inter-stream and inter-symbol interference. These tasks make fulfilling the other one more difficult and the equalizer has to find some kind of a compromise.

In a turbo receiver, after first iteration, the operation of a turbo equalizer is biased towards improved detection with the aid of a-priori information about channel symbols obtained from the decoder.

An embodiment of the invention is related to this chip-level linear turbo equalization especially in HSDPA systems where the multiple users are typically code-multiplexed into a single carrier signal which is exposed to a wireless communication channel and thereafter received by independent users. Since a user device is primarily interested only in the data addressed to it, it may regard the data of other users as intra-cell interference. The embodiment describes a method to take the intra-cell interference of this type into account in adjusting coefficients of a turbo chip equalizer at second and following iterations.

In general, after a first iteration, turbo equalizers rely on reliability information pertaining to transmitted data symbols or chips, irrespective of whether they are in relation to a desired user or other users. Reliability information relating to the desired user is typically obtained from a channel decoder. Instead, no reliability information relating to other (co-channel) users are available, because they are not detected or decoded. Additionally, the number of interfering users as well as the power levels they use in relation to the power level of the desired user is typically unknown for the turbo equalizer. Despite of this, the turbo equalizer needs to estimate the overall reliability of the transmitted symbols or chips, encompassing the impact of the desired symbols or chips as well as the undesired ones.

The operation of an LMMSE SISO equalization is described by using the following system model. The system model includes in this example 2 reception antennas, but naturally the number of antennas may vary. It should be noted that in the following equations, vectors and matrices are marked by using bold type printing.

A received signal may be:

$$r = Hx + n, \quad (1)$$

wherein $$r = [r_1^T, r_2^T]^T \quad (2)$$
$$x = [x_1^T, x_2^T]^T$$
$$n = [n_1^T, n_2^T]^T$$
$$H = \begin{bmatrix} H_{00} & H_{10} \\ H_{01} & H_{11} \end{bmatrix},$$

wherein
$r_m^T$ denotes a vector of received samples at a reception antenna m,
x denotes a matrix of transmitted chips,
$x_i^T$ denotes a vector of transmitted chips from a transmission antenna n,
n denotes a matrix of zero-mean additive white Gaussian noise (AWGN) samples at reception,
$n_i^T$ denotes a vector of zero-mean additive white Gaussian noise (AWGN) samples at a reception antenna m,
T denotes transpose, and
H denotes a channel convolution matrix.

In a HSDPA system, transmitted chip sequence x is formed as a sum of multiple code channels, where some of the code channels may belong to undesired users:

$$x = \alpha_d W * \sum_{j=1}^{J} d_j + \alpha_p c_p + \alpha_{ctrl} c_{ctrl} + \alpha_{ocns} u_{ocns}, \quad (3)$$

wherein
$\alpha_d$ denotes an amplitude of desired data chips, $$W = \begin{bmatrix} w_1 & w_3 \\ w_2 & w_4 \end{bmatrix}$$

is a precoding matrix,
$\Sigma$ denotes a summing operation,
* denotes a multiplication operation,
$d_j = [d_{1,j}^T, d_{2,j}^T]^T$ denotes data chips transmitted at a code channel j,
$\alpha_p$ denotes an amplitude of a pilot channel (such as a common pilot channel (CPICH),
$c_p = [c_{1,p}^T, c_{2,p}^T]^T$ denotes pilot chips transmitted from the primary and secondary transmission antennas,
$\alpha_{ctrl}$ denotes an amplitude for the control channels of a desired user (such as a primary common control physical channel (PCCPCH)+signalling channel (SCH)),
$c_{ctrl} = [c_{1,ctrl}^T c_{2,ctrl}^T]^T$ denotes chips pertaining to the desired user control channels,
$\alpha_{ocns}$ denotes an amplitude for other (interfering) channels, and
$u_{ocns}$ denotes chips pertaining to other (interfering) users.

A chip estimate at the output of the LMMSE turbo chip equalizer at time i may be expressed as follows:

$$\hat{x} = G_v * s_i^H (HH^H * v * \sigma_n^2 * I)^{-1} * (r - H\bar{x} + s_i \bar{x}_i), \quad (4)$$

wherein
$G_v$ denotes a scaling factor depending on reliability factor v,
* denotes a multiplication operation,
$s_i^H$
H denotes a channel convolution matrix,
$^H$ denotes a Hermitian matrix,
v denotes a reliability factor accounting for the level of uncertainty that pertains to a a-priori information about transmitted chips,
$\sigma_n^2$ denotes noise variance in a receiver,
I denotes an identity matrix,
r denotes a received signal,
$\bar{x}$ denotes chip estimates,
$s_i$ denotes ith column vector of matrix H, and
$\bar{x}_i$ denotes ith element of vector $\bar{x}$.
and wherein the chip estimates $\bar{x}$ (soft or hard bit values) may be determined:

$$\bar{x} = \alpha_d W * \sum_{j=1}^{J} \bar{d}_j + \alpha_p c_p + \alpha_{ctrl} \hat{c}_{ctrl}, \quad (5)$$

wherein
$\alpha_d$ denotes an amplitude of desired data chips, $$W = \begin{bmatrix} w_1 & w_3 \\ w_2 & w_4 \end{bmatrix}$$

is a precoding matrix,

Σ denotes a summing operation,

\* denotes a multiplication operation, $\bar{d}_j = [\bar{d}_{1,j}{}^T, \bar{d}_{2,j}{}^T]^T$ denotes estimated data chips transmitted at a code channel j, $\alpha_p$ denotes an amplitude of a pilot channel (such as a common pilot channel (CPICH), $c_p = [c_{1,p}{}^T c_{2,p}{}^T]^T$ denotes pilot chips transmitted from the primary and secondary transmission antennas, $\alpha_{ctrl}$ denotes an amplitude for the control channels of a desired user (such as a primary common control physical channel (PCCPCH)+signalling channel (SCH)), $c_{ctrl} = [c_{1,ctrl}{}^T c_{2,ctrl}{}^T]^T$ denotes chips pertaining to the desired user control channels, and ^ denotes an estimate.

The reliability factor ν relates to the averaged reliability of bit estimates at the output of a decoder and to relative power levels of potential undetected bits transmitted on a same carrier, assuming value 1, if no a-priori information is available and assuming value 0, if soft bit estimates are equal to transmitted bits and no co-channel interference exists.

An embodiment provides a method for determining reliability factor ν. The embodiment will now be explained by the means of FIG. 2.

A SISO equalizer output signal varies when the reliability factor ν assumes different values. At a first iteration, when no feedback signal from a decoder is available, ν is 1 and vector $\bar{x}$ is typically an all zero vector. Thus a turbo equalizer operates as a normal LMMSE equalizer. At another extreme, when a receiver is able to perfectly recover all transmitted bits (that is $\bar{x}=x$), a reliability factor ν is 0 resulting in the turbo equalizer to operate as a matched filter. In this case interference is cancelled explicitly by subtracting it form the received signal samples whereas at s first iteration an interference suppression was carried out implicitly by an equalizer filter.

In between these two extremes, the LMMSE turbo equalizer makes a trade between interference suppression and increased diversity order with the reliability factor ν acting as an adjustment parameter.

It should be noticed that in a HSDPA system, a turbo equalizer may provide a significant performance gain, if the reliability factor can be determined taking into account reliability pertaining not only to decoded bits of a desired user but also uncertainty pertaining to control data and interfering users. Signal $u_{ocns}$ may include both intra-cell and inter-cell interference which both are unknown to the receiver of the desired user. Likewise, $\alpha_{ocns}$ that is amplitude in other (interfering) channels is also unknown to the receiver of the desired user.

An embodiment provides a method to determine a reliability factor taking into account the above mentioned parameters.

The embodiment starts in block 200.

In block 202, a scaling factor for a reliability factor is determined or received. The scaling factor for a reliability factor may be determined on the basis of simulations and it may depend on several system parameters, such as the number of code channels in use, modulation used, etc, and/or design parameters of a receiver, etc. The scaling factor for a reliability factor may be determined on the design phase of the receiver and updated according to needs. The scaling factor for a reliability factor may be received on the initializing phase or later as an update.

The role of the scaling factor is to ensure that various system and receiver design related aspects are properly taken into account in the calculation of the reliability factor. The scaling factor for a reliability factor is marked as β in equations below.

In block 204, a signal is received and sampled for producing signal samples. Typically, a continuous signal received from a radio path is sampled at an appropriate sampling rate to produce a discrete signal (samples). The Nyquist-Shannon theorem states that a perfect reconstruction of a signal is possible when the sampling frequency is greater than twice the maximum frequency of the signal being sampled. In the sampling, this theorem or oversampling is typically applied.

In block 206, power or energy of an input signal of the interference canceller is determined.

The energy may be determined by multiplying a signal by its complex-conjugate (Hermitian) matrix (marked as H):

$$\text{Energy} = r^H r. \tag{6}$$

The power may be determined by dividing the energy of the input signal by the number of samples used for determining the energy.

In block 208, an estimated replica of a transmitted desired signal is generated by using the signal samples.

The estimated replica of the transmitted desired signal may be generated as follows:

$$\bar{x} = \alpha_d W * \sum_{j=1}^{J} \bar{d}_j + \alpha_p c_p + \alpha_{ctrl} \hat{c}_{ctrl}, \tag{5}$$

wherein $\alpha_d$ denotes an amplitude of a transmitted desired signal,

\* denotes a multiplication operation,

W denotes a pre-coding matrix,

Σ denotes s summing operation,

J denotes the number of code channels in use.

$\bar{d}_j$ denotes estimated data chips on the jth code channel, $\alpha_p$ denotes an amplitude of a pilot channel (such as a common pilot channel (CPICH), $c_p$ denotes pilot chips transmitted from the primary and secondary transmission antennas, $\alpha_{ctrl}$ denotes an amplitude for the control channels of a desired user (such as a primary common control physical channel (PCCPCH)+signalling channel (SCH)), and $\hat{c}_{ctrl}$ denotes chips pertaining to the desired user control channels.

It should be appreciated that many options for determining the estimated replica of the desired transmit signal exist: only estimated data chips are included, estimated data and pilot chips are included, or estimated data chips, pilot chips and any number of control channel chips are included.

In block 210, the estimated replica of the transmitted desired signal is subtracted from the input signal of the interference canceller for generating a residual signal.

The subtraction operation may be carried out as follows:

$$r_{res} = r - H * \left( \alpha_d W * \sum_{j=1}^{J} \bar{d}_j + \alpha_p c_p + \alpha_{ctrl} \hat{c}_{ctrl} \right), \tag{7}$$

wherein r denotes an input signal of the interference canceller, $\alpha_d$ denotes an amplitude of a transmitted desired signal, H denotes a channel convolution matrix, \* denotes a multiplication operation, W denotes a pre-coding matrix,
Σ denotes s summing operation,
J denotes the number of code channels in use,
$\bar{d}_j$ denotes estimated data chips on the jth code channel,
$\alpha_p$ denotes an amplitude of a pilot channel (such as a common pilot channel (CPICH),
$c_p$ denotes pilot chips transmitted from the primary and secondary transmission antennas,
$\alpha_{ctrl}$ denotes an amplitude for the control channels of a desired user (such as a primary common control physical channel (PCCPCH)+signalling channel (SCH)), and
$\hat{c}_{ctrl}$ denotes chips pertaining to the desired user control channels.

In block 212, power or energy of the residual signal is determined.

In this embodiment, the energy may be determined by multiplying a signal by its complex-conjugate (Hermitian) matrix (marked as H):

$$r_{res}^H r_{res} = \left( r - H * \left( \alpha_d W * \sum_{j=1}^{J} \bar{d}_j + \alpha_p c_p + \alpha_{ctrl} \hat{c}_{ctrl} \right) \right)^H * \left( r - H * \left( \alpha_d W * \sum_{j=1}^{J} \bar{d}_j + \alpha_p c_p + \alpha_{ctrl} \hat{c}_{ctrl} \right) \right), \quad (8)$$

wherein
r denotes an input signal of the interference canceller,
$\alpha_d$ denotes an amplitude of a transmitted desired signal,
H denotes a channel convolution matrix,
* denotes a multiplication operation,
W denotes a pre-coding matrix,
Σ denotes s summing operation,
J denotes the number of code channels in use,
$\bar{d}_j$ denotes estimated data chips on the jth code channel,
$\alpha_p$ denotes an amplitude of a pilot channel (such as a common pilot channel (CPICH),
$c_p$ denotes pilot chips transmitted from the primary and secondary transmission antennas,
$\alpha_{ctrl}$ denotes an amplitude for the control channels of a desired user (such as a primary common control physical channel (PCCPCH)+signalling channel (SCH)),
$\hat{c}_{ctrl}$ denotes chips pertaining to the desired user control channels, and
$^H$ denotes a complex-conjugate (Hermitian) matrix.

A power may be determined by dividing the energy by the number of samples used for determining the energy.

In block 214, the power or energy of the residual signal is divided by the power or energy of the input signal of the interference canceller, and a result of the division is multiplied by the scaling factor of a reliability factor for obtaining the reliability factor for adjusting equalizer coefficients.

In this embodiment, the reliability factor v may be obtained as follows:

$$v = \beta * \frac{r_{res}^H r_{res}}{r^H r} \quad (9)$$

$$= \beta * \frac{\left( r - H * \left( \alpha_d W * \sum_{j=1}^{J} \bar{d}_j + \alpha_p c_p + \alpha_{ctrl} + \hat{c}_{ctrl} \right) \right)^H *}{r^H}$$

-continued $$\frac{\left( r - H * \left( \alpha_d W * \sum_{j=1}^{J} \bar{d}_j + \alpha_p c_p + \alpha_{ctrl} + \hat{c}_{ctrl} \right) \right)}{r},$$

wherein
$r_{res}$ denotes a residual signal,
r denotes an input signal of the interference canceller,
β denotes a scaling factor of a reliability factor,
$\alpha_d$ denotes an amplitude of a transmitted desired signal,
H denotes a channel convolution matrix,
* denotes a multiplication operation,
W denotes a pre-coding matrix,
Σ denotes s summing operation,
J denotes the number of code channels in use,
$\bar{d}_j$ denotes estimated data chips on the jth code channel,
$\alpha_p$ denotes an amplitude of a pilot channel (such as a common pilot channel (CPICH),
$c_p$ denotes pilot chips transmitted from the primary and secondary transmission antennas,
$\alpha_{ctrl}$ denotes an amplitude for the control channels of a desired user (such as a primary common control physical channel (PCCPCH)+signalling channel (SCH)),
$\hat{c}_{ctrl}$ denotes chips pertaining to the desired user control channels, and
$^H$ denotes a complex-conjugate (Hermitian) matrix.

The embodiment ends in block 216. Many options for repeating the embodiment is provided. Arrow 218 shows one of them. The Arrow 218 illustrates that the scaling factor of a reliability factor is not necessarily determined or received every time a reliability factor is determined, but it can be maintained the same for longer or shorter periods according to current needs. It may be updated if, for instance, the radio system changes.

The steps/points, signaling messages and related functions described above in FIG. 2 are in no absolute chronological order, and some of the steps/points may be performed simultaneously or in an order differing from the given one. Other functions can also be executed between the steps/points. Some of the steps/points or part of the steps/points can also be left out or replaced by a corresponding step/point or part of the step/point.

An embodiment usually utilises a feedback path from a decoder to an equalizer. In the following, one example of such a feedback path is described in detail. The description is given in a reverse order, starting from the soft chip values and proceeding to log-likelihood ratio (LLR)-values in the decoder output. A block diagram of the feedback path from the decoder output ($LLR_0(b_l)$) to an equalizer and the channel estimator is depicted in FIG. 3.

Spread (soft or hard) symbols are obtained as follows (block 304):

$$\bar{d}_j = C_{j,d} * \bar{a}_j, \quad (10)$$

wherein
$C_{j,d}$ denotes a signature matrix of the jth code channel of a high speed downlink shared channel (HS-DSCH, including both a channelization code and scrambling code),
* denotes a multiplication operation, and
$\bar{a}_j$ denotes symbol decisions of the jth code channel.

A symbol decision for a symbol $a_i$ may be determined as follows (block 302):

$$\overline{a}_i = \sum_{k=1}^{K} A_k p_{ap}(a_i = A_k), \quad (11)$$

wherein, $\Sigma$ denotes a summing operation, $A_k$ denotes a kth constellation point, and $p_{ap}$ denotes a a-posteriori symbol power density function which may be defined as:

$$p_{ap}(a_i = A_k) = \prod_{\substack{l=1 \\ b_l \to (a_i = A_k)}}^{\log_2 K} p_{ap}(b_l), \quad (12)$$

wherein $\Pi$ denotes a multiplication operation, and $b_l \to (a_i = A_k)$ denotes that the value (either zero or one) assigned for bit $b_l$ is consistent with assignment $a_i = A_k$. Additionally, a-posteriori probabilities $p_{ap}(b_l)$ may be calculated form the LLR-values $LLR_o(b_l)$ of the decoder output as follows:

$$p_{ap}(b_l = 0) = \frac{e^{LLR_o(b_l)}}{1 + e^{LLR_o(b_l)}} \quad (13)$$

$$p_{ap}(b_l = 1) = 1 - p_{ap}(b_l = 0),$$

wherein e is a base of the natural logarithm and known as Napier's constant, $LLR_o$ denotes a log-likelihood ratio (LLR)—value in a decoder output, and $b_l$ denotes a bit of interest.

Equivalently, the a-posteriori bit probabilities $p_{ap}(b_l)$ may be expressed in terms of $\tan h(LLR_o(b_l)/2$ (tan h denotes a hyberbolic tangent function) as follows:

$$p_{ap}(b_l = 1) = \frac{1}{2} * \left[1 - \tanh\left(\frac{LLR_o(b_l)}{2}\right)\right] \quad (14)$$

$$p_{ap}(b_l = 0) = \frac{1}{2} * \left[1 + \tanh\left(\frac{LLR_o(b_l)}{2}\right)\right],$$

wherein $LLR_o$ denotes a log-likelihood ratio (LLR)—value in a decoder output, $b_l$ denotes a bit of interest,

* denotes a multiplication operation, and tan h denotes a hyberbolic tangent function.

Values according to equation (14) are determined in block 300.

It should be understood that equation (13) may represent a more preferable implementation due to required smaller memory (table) size. This is due to smoother curvature.

In the feedback path of FIG. 3 in addition to the processing described above also spreading, channelization and scrambling are typically carried out (block 306). Further, symbols are multiplied by an amplitude of a transmitted desired signal ($\alpha_d$) (block 308), pre-coded in block 310 and summed with term $\alpha_p c_p + \alpha_{ctrl} \hat{c}_{ctrl}$ (block 312), wherein $\alpha_p$ denotes an amplitude of a pilot channel (such as a common pilot channel (CPICH), $c_p$ denotes pilot chips transmitted from the primary and secondary transmission antennas, $\alpha_{ctrl}$ denotes an amplitude for the control channels of a desired user (such as a primary common control physical channel (PCCPCH)+signalling channel (SCH)), and $\hat{c}_{ctrl}$ denotes chips pertaining to the desired user control channels.

FIGS. 4A-B are block diagrams of apparatuses according to an embodiment of the invention. An apparatus may be a node, or a corresponding node component, or a user terminal, etc. Although the apparatuses have been depicted as one entity, different modules and a possible memory may be implemented in one or more physical or logical entities.

An apparatus is configured to determine or receive a scaling factor for a reliability factor (414), receive and sample a signal for producing signal samples (402), determine power or energy of the input signal of an interference canceller (404), generate an estimated replica of a transmitted desired signal by using the signal samples (406), subtract the estimated replica from the input signal of an interference canceller for generating a residual signal (408), determine power or energy of the residual signal (410), and divide the power or energy of the residual signal by the power or energy of the input signal of an interference canceller and multiply a result of the division by the scaling factor of a reliability factor for obtaining a reliability factor for adjusting equalizer coefficients (412).

On the other hand, the apparatus may comprise a sampler configured to receive and sample a signal for producing signal samples, a first determinator configured to receive or determinate a scaling factor for a reliability factor, a determinator configured to determine power or energy of the input signal of an interference canceller, a generator configured to generate an estimated replica of a transmitted desired signal by using the signal samples, a residual subtractor configured to subtract the estimated replica from the input signal of an interference canceller for generating a residual signal, a residual determinator configured to determine power or energy of the residual signal; and a divider configured to divide the power or energy of the residual signal by the power or energy of the input signal of an interference canceller and a multiplier configured to multiply a result of the division by the scaling factor of a reliability factor for obtaining a reliability factor for adjusting equalizer coefficients.

The procedure is explained in further detail above in relation to FIGS. 2 and 3. It should be appreciated that the apparatus may receive the scaling factor for a reliability factor on the initializing phase or later as an update.

In FIG. 4A, a sampler (402) is depicted with a dotted line, since the apparatus may use an external receiver and sampler. The first determinator (414) configured to determine the scaling factor for a reliability factor is also marked with a dotted line, since an option of receiving the scaling factor for a reliability factor exists. Typically, when the apparatus itself determines this scaling factor, it receives information on required parameters.

On the other hand, the apparatus (400) may include means (414) for determining or receiving a scaling factor for a reliability factor, means (402) for receiving and sampling a signal for producing signal samples, means (404) for determining power or energy of the input signal of the interference canceller, means (406) for generating an estimated replica of a transmitted desired signal by using the signal samples, means (408) for subtracting the estimated replica of the transmitted desired signal from the input signal of the interference canceller for generating a residual signal, means (410) for determining power or energy of the residual signal, and means (412) for dividing the power or energy of the residual signal by the power or energy of the input signal of the interference canceller and multiplying a result of the division by the scaling factor of a reliability factor for obtaining a reliability factor for adjusting equalizer coefficients.

In FIG. 4A, means for receiving are depicted with a dotted line, since the apparatus may use an external receiver, and the same applies to a sampler. Means for determining the scaling factor for a reliability factor is also marked with a dotted line, since it is a choice for receiving the scaling factor for a reliability factor.

It is understood that means may also be combined in a similar manner as in FIG. 4B.

In another embodiment depicted in FIG. 4B, the apparatus may comprise a sampler (402) configured to receive and sample a signal for producing signal samples, a determinator (404) configured to receive or determinate a scaling factor for a reliability factor and to determine power or energy of an input signal of an interference canceller, a generator (406) configured to generate an estimated replica of a transmitted desired signal by using the signal samples, a residual processor (408) configured to subtract the estimated replica from the input signal of an interference canceller for generating a residual signal and to determine power or energy of the residual signal, and a divider (410) configured to divide the power or energy of the residual signal by the power or energy of the input signal of an interference canceller and a multiplier configured to multiply a result of the division by the scaling factor of a reliability factor for obtaining a reliability factor for adjusting equalizer coefficients.

In FIG. 4B, a sampler (402) is depicted with a dotted line, since the apparatus may use an external receiver and sampler. It should be appreciated to notice that the scaling factor for a reliability factor may be received or the apparatus may determine it itself. Typically, when the apparatus itself determines the scaling factor, it receives information on required parameters.

It should be understood that each of the apparatuses may include a receiver for receiving a signal or the apparatus may use a an external receiver which it is operationally coupled to, in which case receiving may mean receiving a signal from the external receiver. Apparatuses may also receive an already sampled signal.

The apparatus may be any node or a host which is able to carry out the tasks described above.

The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a multimedia device, personal computer, game console, laptop (notebook), personal digital assistant, mobile station (mobile phone), or any kind of portable computing device, and line telephone.

The apparatus may be implemented as a single module, unit or chip set including one or more processors.

The apparatus may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The present apparatus may comprise one or more processors and memories that can be utilized in an embodiment. The apparatus may be a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus.

The apparatus may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

An embodiment provides a computer program embodied on a distribution medium, comprising program instructions which, when loaded into an electronic apparatus, constitute the apparatus as explained above. The computer program may be embodied on a computer readable medium, and be configured to control a processor to perform embodiments of the method described above in relation to FIG. 2.

The computer program may be in a source code form, object code form, or in some intermediate form, and it may be stored in some sort of carrier or a distribution medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

Another embodiment provides a computer program distribution medium readable by a computer and encoding a computer program of instructions for executing a computer process for carrying out embodiments of the method described above in relation to FIG. 2.

The computer program distribution medium may be a computer readable medium, a program storage medium, a record medium, a computer readable memory, a computer readable software distribution package, a computer readable signal, a computer readable telecommunications signal, and/or a computer readable compressed software package.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor; and
at least one non-transitory memory including computer program code,
wherein the at least one non-transitory memory and the computer program code are configured to cause the at least one processor at least to:
receive and sample a signal for producing signal samples;
determine a scaling factor for a reliability factor and to determine power or energy of an input signal;
generate an estimated replica of a transmitted desired signal by using the signal samples;
subtract the estimated replica of the transmitted desired signal from the input signal for generating a residual signal and to determine power or energy of the residual signal; and
divide the power or energy of the residual signal by the power or energy of the input signal and a multiplier configured to multiply a result of the division by the scaling factor of the reliability factor for obtaining a reliability factor for adjusting equalizer coefficients.

2. The apparatus of claim 1, wherein the equalizer coefficients are obtained for a chip-level linear turbo equalizer.

3. The apparatus of claim 1, wherein the estimated replica of the transmitted desired signal is generated as follows:

$$\bar{x} = \alpha_d W * \sum_{j=1}^{J} \bar{d}_j + \alpha_p c_p + \alpha_{ctrl} \hat{c}_{ctrl},$$

wherein
$\alpha_d$ denotes an amplitude of the transmitted desired signal,
* denotes a multiplication operation,
W denotes a pre-coding matrix,
$\Sigma$ denotes a summing operation,
$\bar{d}_j$ denotes estimated data chips on a jth code channel,
J denotes a number of code channels in use, $\alpha_p$ denotes an amplitude of a pilot channel (such as a common pilot channel (CPICH),
$c_p$ denotes pilot chips transmitted from primary and secondary transmission antennas,
$\alpha_{ctrl}$ denotes an amplitude for control channels of a desired user control channel (such as a primary common control physical channel (PCCPCH)+signalling channel (SCH)), and
$\hat{c}_{ctrl}$ denotes chips pertaining to the desired user control channels.

4. The apparatus of claim 1, wherein the reliability factor for the adjusting equalizer coefficients, v is obtained as follows:

$$v = \beta * \frac{r_{res}^H r_{res}}{r^H r}$$

$$= \beta * \frac{\left(r - H * \left(\alpha_d W * \sum_{j=1}^{J} \bar{d}_j + \alpha_p c_p + \alpha_{ctrl} + \hat{c}_{ctrl}\right)\right)^H *}{r^H}$$

$$\frac{\left(r - H * \left(\alpha_d W * \sum_{j=1}^{J} \bar{d}_j + \alpha_p c_p + \alpha_{ctrl} + \hat{c}_{ctrl}\right)\right)}{r}$$

wherein
$r_{res}$ denotes a residual signal,
r denotes an input signal,
$\beta$ denotes a scaling factor for a reliability factor,
$a_d$ denotes an amplitude of the transmitted desired signal,
H denotes a channel convolution matrix,
* denotes a multiplication operation,
W denotes a pre-coding matrix,
$\Sigma$ denotes a summing operation,
$\bar{d}_j$ denotes estimated data chips on an ith code channel,
J denotes a number of code channels in use,
$^H$ denotes a complex-conjugate (Hermitian) matrix,
$\alpha_p$ denotes an amplitude of a pilot channel (such as a common pilot channel (CPICH),
$c_p$ denotes pilot chips transmitted from primary and secondary transmission antennas,
$a_{ctrl}$ denotes an amplitude for control channels of a desired user control channel (such as a primary common control physical channel (PCCPCH)+signalling channel (SCH)), and
$\hat{c}_{ctrl}$ denotes chips pertaining to the desired user control channels.

5. The apparatus of claim 4, wherein at a first iteration, when no feedback signal from a decoder is available, the reliability factor for the adjusting equalizer coefficients is 1.

6. The apparatus of claim 4, wherein in the case of a perfect recovery of transmitted bits, the reliability factor for the adjusting equalizer coefficients is 0.

7. The apparatus of claim 6, wherein the apparatus comprises a user terminal.

8. A method comprising:
determining a scaling factor for a reliability factor;
receiving and sampling a signal for producing signal samples;
determining power or energy of an input signal;
generating an estimated replica of a transmitted desired signal by using the signal samples;
subtracting the estimated replica of the transmitted desired signal from the input signal for generating a residual signal;
determining power or energy of the residual signal; and dividing the power or energy of the residual signal by the power or energy of the input signal and multiplying a result of the division by the scaling factor of the reliability factor for obtaining a reliability factor for adjusting equalizer coefficients.

9. The method of claim 8, wherein the equalizer coefficients are obtained for a chip-level linear turbo equalizer.

10. The method of claim 8, wherein the estimated replica of the transmitted desired signal is generated as follows:

$$\bar{x} = \alpha_d W * \sum_{j=1}^{J} \bar{d}_j + \alpha_p c_p + \alpha_{ctrl} \hat{c}_{ctrl},$$

wherein
$a_d$ denotes an amplitude of the transmitted desired signal,
$*$ denotes a multiplication operation,
$W$ denotes a pre-coding matrix,
$\Sigma$ denotes a summing operation,
$\bar{d}_j$ denotes estimated data chips on an ith code channel,
$J$ denotes a number of code channels in use
$\alpha_p$ denotes an amplitude of a pilot channel (such as a common pilot channel (CPICH),
$c_p$ denotes pilot chips transmitted from primary and secondary transmission antennas,
$\alpha_{ctrl}$ denotes an amplitude for control channels of a desired user control channel (such as a primary common control physical channel (PCCPCH)+signalling channel (SCH)), and
$\hat{c}_{ctrl}$ denotes chips pertaining to the desired user control channels.

11. The method of claim 8, wherein the reliability factor for the adjusting equalizer coefficients, v, is obtained as follows:

$$v = \beta * \frac{r_{res}^H r_{res}}{r^H r}$$

$$= \beta * \frac{\left(r - H * \left(\alpha_d W * \sum_{j=1}^{J} \bar{d}_j + \alpha_p c_p + \alpha_{ctrl} + \hat{c}_{ctrl}\right)\right)^H *}{r^H}$$

$$\frac{\left(r - H * \left(\alpha_d W * \sum_{j=1}^{J} \bar{d}_j + \alpha_p c_p + \alpha_{ctrl} + \hat{c}_{ctrl}\right)\right)}{r}$$

wherein
$r_{res}$ denotes a residual signal,
$r$ denotes an input signal,
$\beta$ denotes a scaling factor for a reliability factor,
$\alpha_d$ denotes an amplitude of the transmitted desired signal,
$H$ denotes a channel convolution matrix,
$*$ denotes a multiplication operation,
$W$ denotes a pre-coding matrix,
$\Sigma$ denotes a summing operation,
$\bar{d}_j$ denotes estimated data chips on and ith code channel,
$J$ denotes a number of code channels in use,
$^H$ denotes a complex-conjugate (Hermitian) matrix,
$\alpha_p$ denotes an amplitude of a pilot channel (such as a common pilot channel (CPICH),
$c_p$ denotes pilot chips transmitted from primary and secondary transmission antennas,
$a_{ctrl}$ denotes an amplitude for control channels of a desired user control channel (such as a primary common control physical channel (PCCPCH)+signalling channel (SCH)), and $\hat{c}_{ctrl}$ denotes chips pertaining to the desired user control channels.

12. The method of claim 11, wherein at a first iteration, when no feedback signal from a decoder is available, the reliability factor for the adjusting equalizer coefficients is 1.

13. The method of claim 11, wherein in the case of a perfect recovery of transmitted bits, the reliability factor for the adjusting equalizer coefficients is 0.

14. A computer program product comprising at least one non-transitory computer-readable storage medium having computer-readable program instructions for one or more programs stored therein, the computer-readable program instructions comprising program instructions configured to cause an apparatus to perform a method comprising:
determining a scaling factor for a reliability factor;
receiving and sampling a signal for producing signal samples;
determining power or energy of an input signal;
generating an estimated replica of a transmitted desired signal by using the signal samples;
subtracting the estimated replica of the transmitted desired signal from the input signal for generating a residual signal;
determining power or energy of the residual signal; and
dividing the power or energy of the residual signal by the power or energy of the input signal and multiplying a result of the division by the scaling factor of the reliability factor for obtaining a reliability factor for adjusting equalizer coefficients.

15. The computer program product of claim 14, wherein at a first iteration, when no feedback signal from a decoder is available, the reliability factor for the adjusting equalizer coefficients is 1.

16. The computer program product of claim 14, wherein in the case of a perfect recovery of transmitted bits, the reliability factor for the adjusting equalizer coefficients is 0.

17. The computer program product of claim 14, wherein the estimated replica of the transmitted desired signal is generated as follows:

$$\bar{x} = \alpha_d W * \sum_{j=1}^{J} \bar{d}_j + \alpha_p c_p + \alpha_{ctrl} \hat{c}_{ctrl},$$

wherein
$a_d$ denotes an amplitude of a transmitted desired signal,
$*$ denotes a multiplication operation,
$W$ denotes a pre-coding matrix,
$\Sigma$ denotes a summing operation,
$\bar{d}_j$ denotes estimated data chips on an ith code channel,
$J$ denotes a number of code channels in use,
$\alpha_p$ denotes an amplitude of a pilot channel (such as a common pilot channel (CPICH),
$c_p$ denotes pilot chips transmitted from primary and secondary transmission antennas,
$\alpha_{ctrl}$ denotes an amplitude for control channels of a desired user control channel (such as a primary common control physical channel (PCCPCH)+signalling channel (SCH)), and$_{ctrl}$
$\hat{c}_{ctrl}$ denotes chips pertaining to the desired user control channels.

18. The computer program product of claim 14, wherein the reliability factor for the adjusting equalizer coefficients, v, is obtained as follows:

$$v = \beta * \frac{r_{res}^H r_{res}}{r^H r}$$

$$= \beta * \frac{\left(r - H*\left(\alpha_d W * \sum_{j=1}^{J} \overline{d}_j + \alpha_p c_p + \alpha_{ctrl} + \hat{c}_{ctrl}\right)\right)^H *}{r^H}$$

$$\frac{\left(r - H*\left(\alpha_d W * \sum_{j=1}^{J} \overline{d}_j + \alpha_p c_p + \alpha_{ctrl} + \hat{c}_{ctrl}\right)\right)}{r}$$

wherein $r_{res}$ denotes a residual signal, r denotes an input signal,

β denotes a scaling factor for a reliability factor, $\alpha_d$ denotes an amplitude of a transmitted desired signal, H denotes a channel convolution matrix,

* denotes a multiplication operation,

W denotes a pre-coding matrix,

Σ denotes a summing operation, $\overline{d}_j$ denotes estimated data chips on an ith code channel, J denotes a number of code channels in use, $^H$ denotes a complex-conjugate (Hermitian) matrix, $\alpha_p$ denotes an amplitude of a pilot channel (such as a common pilot channel (CPICH), $c_p$ denotes pilot chips transmitted from primary and secondary transmission antennas, $\alpha_{ctrl}$ denotes an amplitude for control channels of a desired user control channel (such as a primary common control physical channel (PCCPCH)+signalling channel (SCH)), and $\hat{c}_{ctrl}$ denotes chips pertaining to the desired user control channels.

19. The computer program product of claim 14, wherein the equalizer coefficients are obtained for a chip-level linear turbo equalizer.

* * * * *